United States Patent [19]

Turkowski

[11] Patent Number: 5,819,283
[45] Date of Patent: Oct. 6, 1998

[54] METHOD AND SYSTEM FOR THE EXTENSIBILITY OF OBJECTS

[75] Inventor: Kenneth E. Turkowski, Palo Alto, Calif.

[73] Assignee: Apple Computer, Inc., Cupertino, Calif.

[21] Appl. No.: 911,347

[22] Filed: Aug. 14, 1997

Related U.S. Application Data

[63] Continuation of Ser. No. 62,620, May 11, 1993, abandoned.

[51] Int. Cl.$^6$ ........................................... G06F 17/30
[52] U.S. Cl. ..................... 707/103; 707/100; 711/171; 711/212
[58] Field of Search ..................... 707/103, 100; 711/171, 212

[56] References Cited

U.S. PATENT DOCUMENTS

| | | | |
|---|---|---|---|
| 4,868,745 | 9/1989 | Patton et al. | 395/412 |
| 5,034,914 | 7/1991 | Osterlund | 395/425 |
| 5,075,847 | 12/1991 | Fromme | 395/700 |
| 5,261,098 | 11/1993 | Katin et al. | 395/650 |
| 5,267,349 | 11/1993 | Barabash et al. | 395/62 |
| 5,325,513 | 6/1994 | Tanaka et al. | 395/500 |
| 5,404,534 | 4/1995 | Foss et al. | 395/683 |
| 5,446,902 | 8/1995 | Islam | 395/703 |
| 5,467,472 | 11/1995 | Williams et al. | 707/1 |
| 5,504,892 | 4/1996 | Atsatt et al. | 707/103 |
| 5,581,761 | 12/1996 | Radia et al. | 707/1 |
| 5,613,105 | 3/1997 | Zbikowski et al. | 707/100 |

OTHER PUBLICATIONS

Kim, W., "Intro to Object Oriented Databases", 1990, pp. 107–109.
Sybil P. Parker, *Dictionary of Scientific and Technical Terms*, Fourth Edition, McGraw–Hill Book Company, p. 682.
Alan Freedman, *The Computer Glossary: The Complete Illustrated Desk Reference*, Sixth Edition, American Management Association, p. 220.

*Primary Examiner*—Thomas G. Black
*Assistant Examiner*—Jean R. Homere
*Attorney, Agent, or Firm*—Carr & Ferrell LLP

[57] ABSTRACT

A data structure is disclosed in which stored objects in a computer system can be extended. The data structure contains a header containing encapsulation information related to the stored object, data describing the essential elements of the object, and at least one subobject extending the description of the object. Header information includes metafile identification, version and revision numbers, endian code information as to the ordering significance of the stored data and a table of contents. Encapsulation information describes the size and type of the individual objects. Essential elements and extensibility data permit additional attribute information to be used and shared among applications which utilize the object.

24 Claims, 7 Drawing Sheets

| | |
|---|---|
| X0 | ID 0 |
| X1 | ID 1 |
| X2 | ID 2 |
| X3 | ID 3 |
| X4 | VERSION # |
| X5 | REVISION # |
| X6 | ENDIAN CODE |
| X7 | RSVD |
| X8 | HEADER SIZE 0 |
| X9 | HEADER SIZE 1 |
| XA | HEADER SIZE 2 |
| XB | HEADER SIZE 3 |
| XC | TOC LOC 0 |
| XD | TOC LOC 1 |
| XE | TOC LOC 2 |
| XF | TOC LOC 3 |

METHOD AND SYSTEM FOR THE EXTENSIBILITY OF OBJECTS

RELATED APPLICATIONS

This is a continuation of application(s) Ser. No. 08/062,620 filed on May 11, 1993, now abandoned.

BACKGROUND OF THE INVENTION

1. Field of the Invention

This invention relates to the organization of computer data and more particularly to a method and system for organizing data objects in a computer data structure to allow the objects to be extended with additional information after the object has been initially created.

2. Description of the Background Art

An object is a computer data structure which can be accessed and utilized by more than one computer application. An example of a typical object might be a geometrical shape, such as a polygon. A polygon object file would contain data which describes the geometrical parameters of the polygon, as well as information relating to the object's other attributes such as color, orientation, shading, vertex normal and the like.

A metafile is a larger computer file containing a collection of objects. Modern metafiles represent objects using {type, size, data} triples. The data of the objects are said to be encapsulated by the {type, size} information. Historically objects in a metafile have been represented with a fixed structure. Expandability of these objects was typically provided for by creating a number of empty fields in each of the objects. The empty fields were filled with null or default values which were skipped until the additional descriptor space was required. Once the available unused spaces were exhausted, further expansion was not possible, and the objects were rendered obsolete, as new objects were required. Replacement of objects creates problems with data incompatibility as the new upgraded objects are introduced. This previous approach of allocating unused space additionally required tremendous design foresight on the part of object architects to plan for upgrading and expansion of objects. Failure to provide sufficient space resulted in obsolete objects, while the provision for excessive expansion would potentially result in large amounts of unused, wasted storage space.

The characteristic which makes objects particularly useful is their ability to be shared by a number of computer applications. By keeping the data structure simple, the same polygon object, for instance, could be used by a drawing program, a word processor, and a graphical presentation application. Although various programs may be able to access and use the same polygon objects, attributes which might be added to the polygon object would vary from application to application.

SUMMARY OF THE INVENTION

In accordance with the present invention, a method and system are disclosed for an extensible object data structure for use by computing machines. The data structure resides in computer mass storage, the mass storage typically consisting of a metafile of individual objects. The metafile contains a header field, which identifies attributes of the metafile including the metafile name or other identifying label, version number, revision number, endian code type, the remaining header size, and the location of the table of contents. Following the header, the metafile contains a sequential collection of objects, each of which may contain one or more subobjects supplementing the attributes of the object.

The object has an encapsulation data field which includes type and size information. The object further contains essential data which is accessed by the computer application program in the utilization of the object. Following the essential data, the object contains extensible data which further modifies and enhances object functionality after the object has been initially created. Each object can contain one or more subobjects, which are appended to the object extensible data. Analogous to the objects, the subobjects contain encapsulation subdata including subtype and subsize. The subobject also contains essential subdata and extensible subdata, for enhancing subobject functionality.

The presence of subobjects appended to the object is identified by reference to the object size field. When subobjects are to be included within the object, the object size field is increased to account for the additional data space utilized by the subobject. When reading the object, the processor of the general purpose computer checks and internally stores the contents of the object size field and as each subobject is processed the space utilized in each of the subobjects is subtracted from the stored object size field. In this way, when the processor has completed reading data from each subobject, the contents of the stored object size field can be checked to determine whether additional subobjects are present. When the stored object size field decrements to zero, all of the object data, including subobjects, has been processed.

DESCRIPTION OF THE PREFERRED EMBODIMENT

Figure 1:
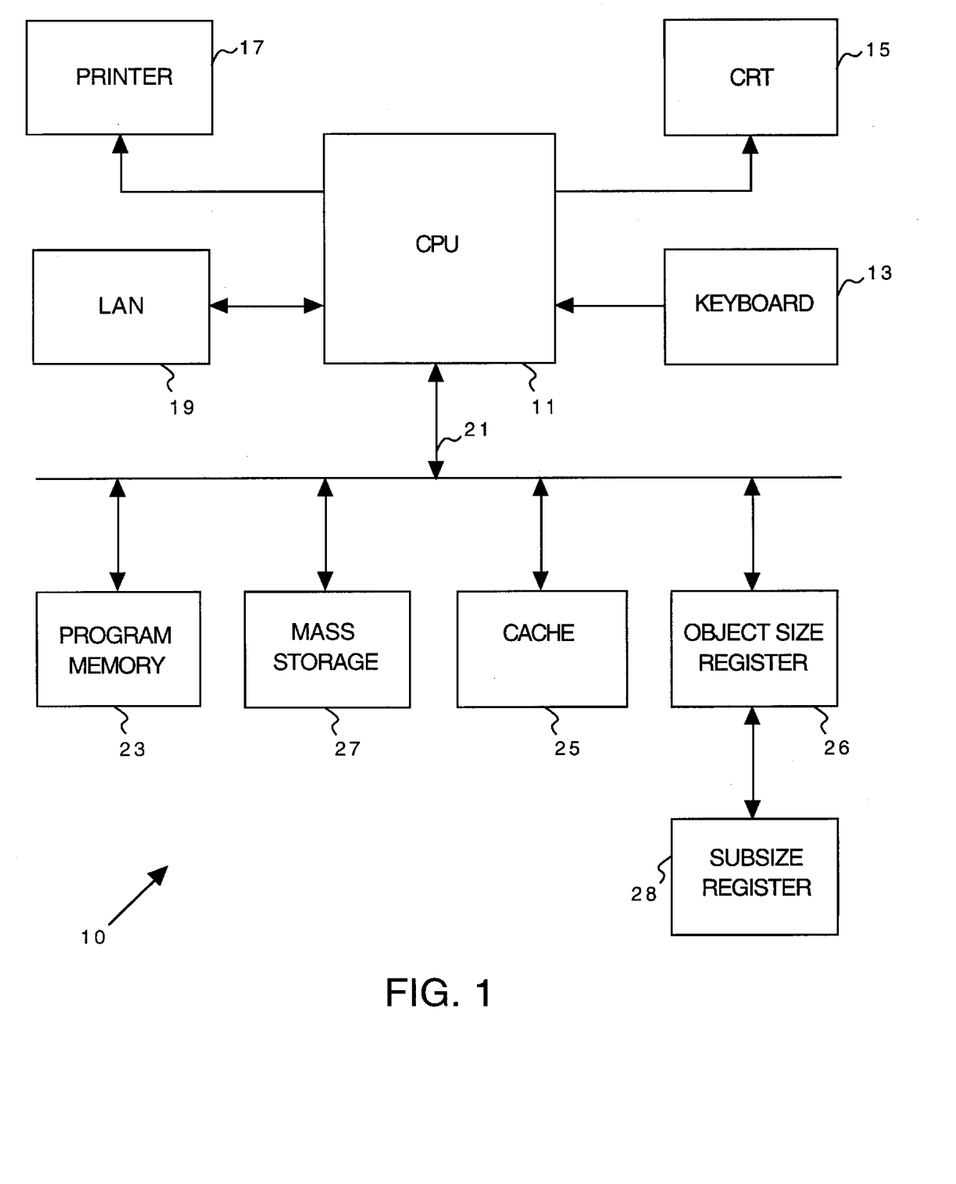
FIG. 1 is a block diagram showing the preferred computer system architecture within which the data structure of the present invention resides.

Referring now to FIG. 1, a diagram is shown of the preferred embodiment of a general purpose computer 10 within which the present invention is utilized. General purpose computer 10 consists of a CPU 11 attached to a number of processing components. CPU 11 contains a keyboard 13 and a CRT 15 through which a user can interact with CPU 11. Printer 17 provides a hard copy of information processed by CPU 11. Optionally, CPU 11 is connected to a Local Area Network (LAN) 19 for interfacing with other processors and general purpose computers. CPU 11 further comprises a data bus 21 for connecting various memories, including program memory 23, cache memory 25 and mass storage 27. Program memory 23 contains operating instructions for directing the control of CPU 11. Cache 25 contains high speed temporary memory for use by CPU 11 in executing program instructions from program memory 23. Also attached to data bus 21 is mass storage 27 which contains stored data utilized by CPU 11 in executing program instructions from program memory 23. An object size register 26, and optionally, a subsize register 28 are further attached to data bus 21 for keeping track of data processing as discussed below.

Figure 2A:
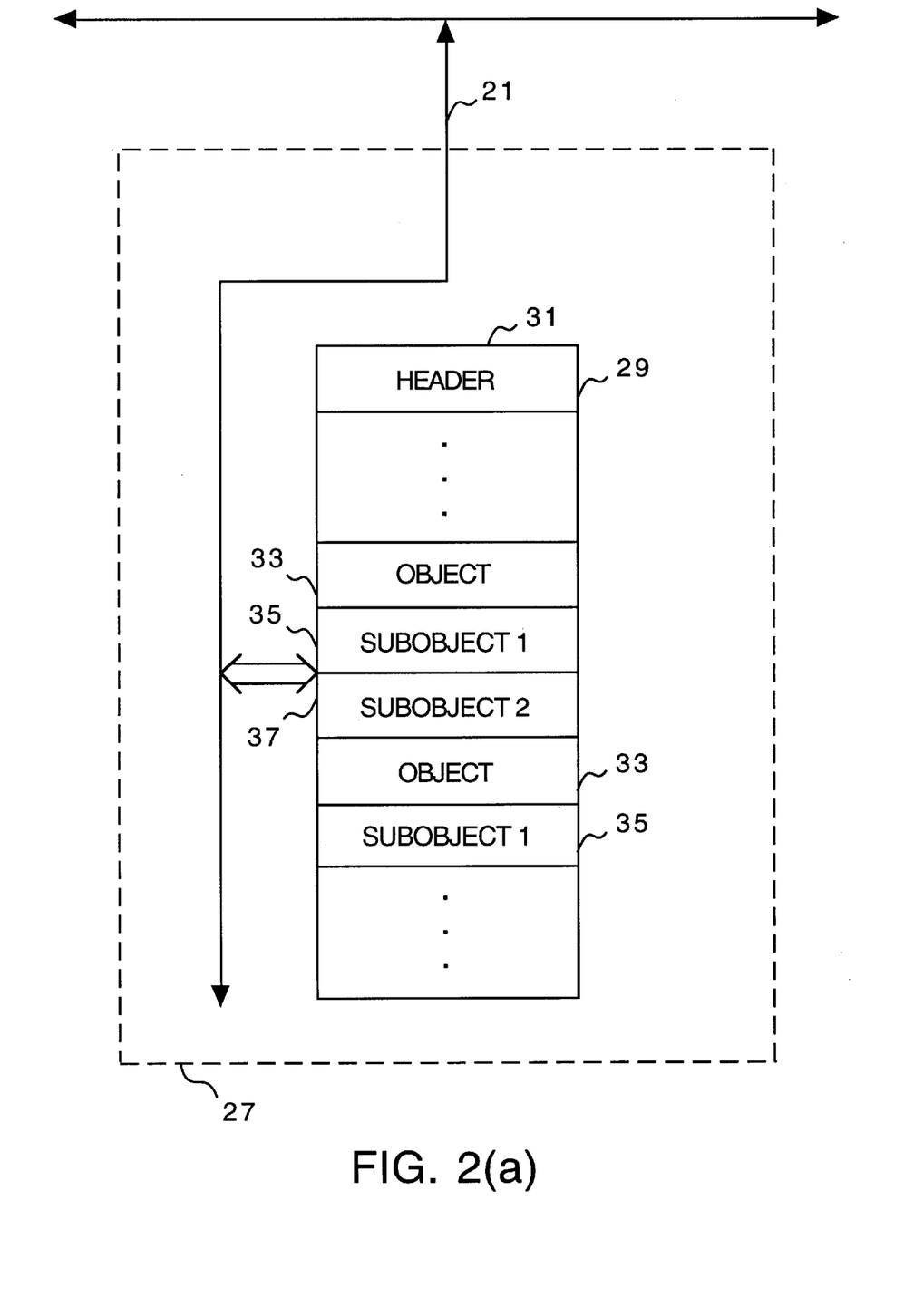
FIG. 2(a) is a detailed block diagram showing the preferred arrangement of objects and subobjects within mass storage.
Figure 2B:
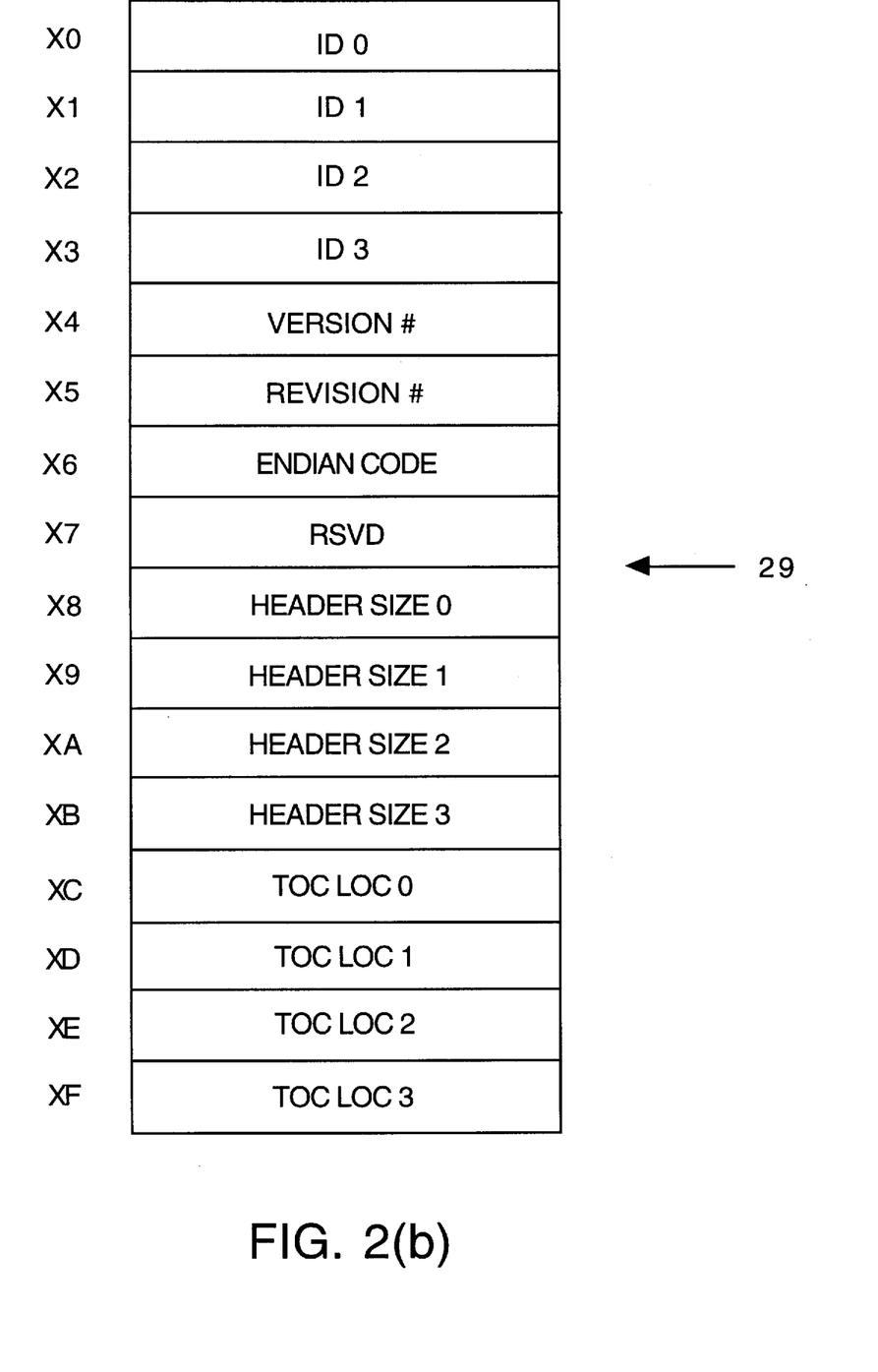
FIG. 2(b) is a detailed block diagram showing the preferred arrangement of the metafile header.

Referring now to FIG. 2(a), a detailed block diagram of a metafile 31 is shown. A metafile is a file containing a collection of objects with relationships between them. Metafile 31 consists of a header 29 which contains information used by CPU 11 for identifying and utilizing the objects contained in metafile 31. Referring also to FIG. 2(b), a detailed block diagram is shown of the metafile header 29, having memory locations ranging from x0 to xF hex. In the preferred embodiment, the header contains 16 total bytes. Four bytes of the header, x0 to x3, are dedicated to a header identifier. This identifier instructs the CPU 11 as to the name or identification symbol given to the metafile 31. The header 29 also contains a one byte version number (x4) and a one byte revision number (x5). The header additionally contains an endian code of one byte (x6) which identifies for the processor the ordering of data within a data word. For example, in a big-endian representation of a data word the most significant byte of that data word appears first, with the least significant byte appearing last in the data word. In the little-endian ordering of a word sequence, the least significant byte appears first, and the most significant byte appears last. Another way of viewing big-endian, is that a byte sequence is read from left to right in descending order of significance. In little endian formation the contrary is true, a byte sequence is read from left to right in ascending order of significance. The preferred header in the present invention also has an unused or reserved byte (x7). The header contains a four byte field (x8–xB) which identifies the size of the remaining header data, and also contains a four byte field (xC–xF) pointing to the table of contents.

Objects 33 in metafile 29 are collections of data which can be shared among various application programs residing in program memory 23. These objects are self identifying in that they contain information as to their size and function. An example of an object is a geometry file defining a polygon. This polygon object would typically be accessed by such applications as drawing programs, graphing packages, and games. An important aspect of the present invention is that subobjects can be appended to these objects to make them more usable and versatile with respect to the various applications. For example, an important attribute for use of the polygon by a drawing program might be line shading of the object. A game application may have no need for polygon shading; however, it may require data defining the three dimensional orientation of the object. Each object 33 in metafile 29 can contain one or more subobjects 35, 37 that may or may not be used by various applications to enhance the functionality of the object. It should be noted that each of the subobjects themselves can further be nested to contain sub-subobjects, although the description of this disclosure is limited to the general case of a single subobject layer.

Figure 3:
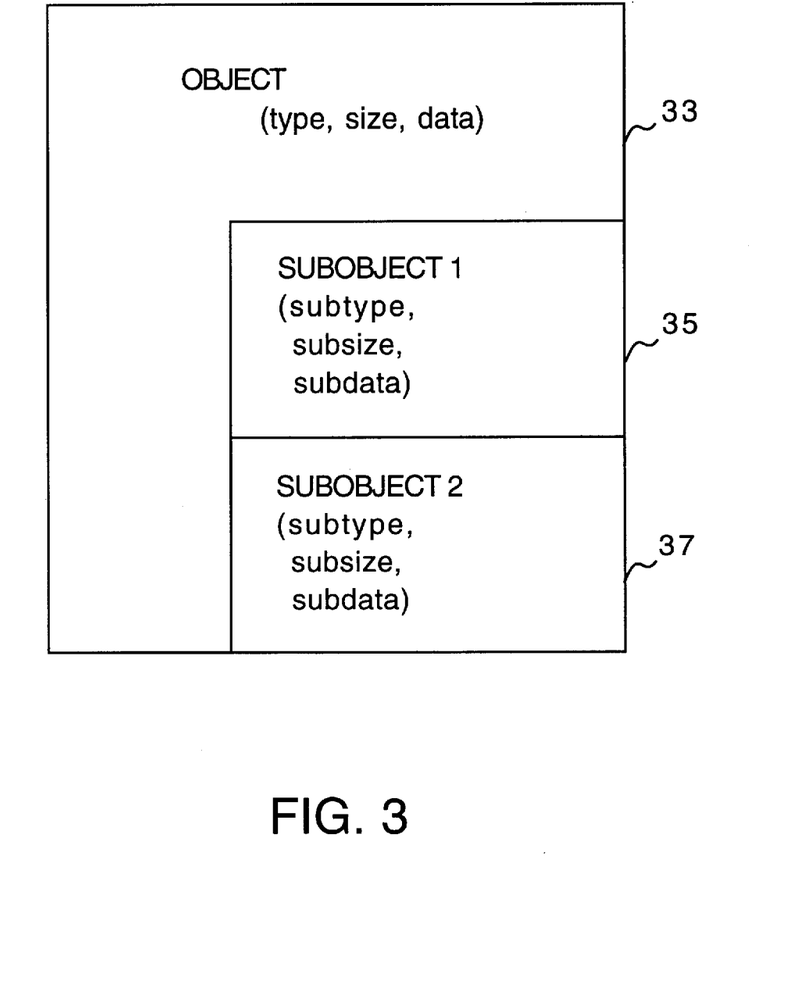
FIG. 3 is a block diagram showing the preferred arrangement and organization of subobjects within objects as taught in the present invention.

Referring now to FIG. 3, a block diagram is shown of a typical object 33 containing a subobject1 35 and a subobject2 37. Object 33 contains information related to the object type, the size of the object block, and data. Type information identifies to the application the nature of the data contained in the object and enables the application program to dispatch or call the appropriate data accessing routine to process the stored information. For instance, in the polygon example, the stored object data is geometry information. In order to process the data, the graphics application program would need to call an appropriate geometry reader that could process the various polygon data points and other attributes. The size data field is an important element in the present invention. The size field identifies to the application program the amount of data contained within the objects. This size field not only identifies the object data, but as discussed below, also indicates the inclusion of any subobject data. The object size data stored in the size field is preferably copied and stored in object size register 26. As the CPU 11 processes data in the object 33 and subobjects 35,37, by sequentially reading bytes of data, the object size register 26 is decremented for each data byte read. The CPU 11 determines that the entire object 33, and its incorporated subobjects, have all been processed by testing the object size register 26. When the object size register 26 decrements to zero, the entire object has been processed. When the object size register contains a non-zero number, additional object data remains to be processed. In addition to type and size information, the object contains other data which is discussed in more detail with respect to FIG. 4, below.

The structure of each of the subobjects is similar to each of the larger objects within which the subobjects are contained. Subobjects 35,37 each contain subtype, subsize, and subdata information. Subtype data identifies the nature and formatting of the information contained in the subobject, and the subsize data contains a field for identifying the size of the object in order that the CPU 11 will be able to determine when the subobject data has been fully read.

Figure 4:
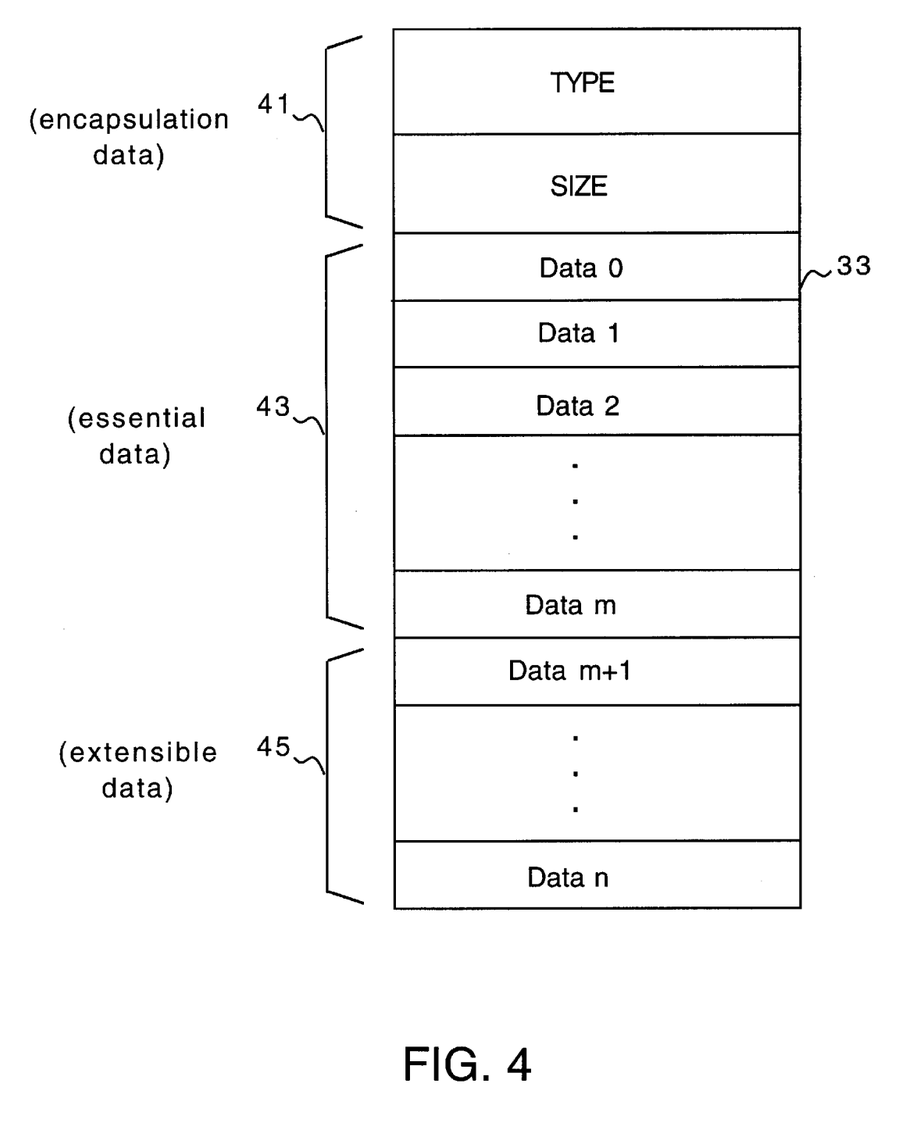
FIG. 4 is a detailed block diagram showing the preferred organization of objects as taught in the present invention.

Referring now to FIG. 4, a memory diagram is shown of object 33 with fields represented for each of the information bytes contained as part of the object 33. The first set of data includes the encapsulation data 41. Encapsulation data contains byte information related to the type of object 33 stored. Encapsulation data 41 further incorporates a data field identifying the size of the object. The data field describing the size of the object not only identifies the size of the object, but as discussed above, also includes the memory storage requirement of all subobjects contained within the object. In the memory map represented in FIG. 4, essential data 43 follows the encapsulation data 41. Essential data 43 is mapped as a sequence of data words, Data 0 through Data m, and relates to required attributes of the object 33. Extensible data 45 is mapped as a sequence of data words, Data m+1 to Data n, and relates to additional general attributes which provide functionality to the object 33 after the object has been initially created. The nature of essential and extensible data can be clarified by referring to the example polygon object introduced above. A polygon object would normally contain a type identifier which labels the object as being a geometry. The size of such an example polygon object might be 1024 bytes. Essential data 43, mapped in FIG. 4 as data 0 through data m would, among other attributes, include the number of points of the geometry. Other essential data 43 will include a listing of those points. Extensible data 45 of the example polygon, would be other data used by various applications including the list of vertex shading normals, the list of vertex colors, and other geometry and shading information.

Figure 5:
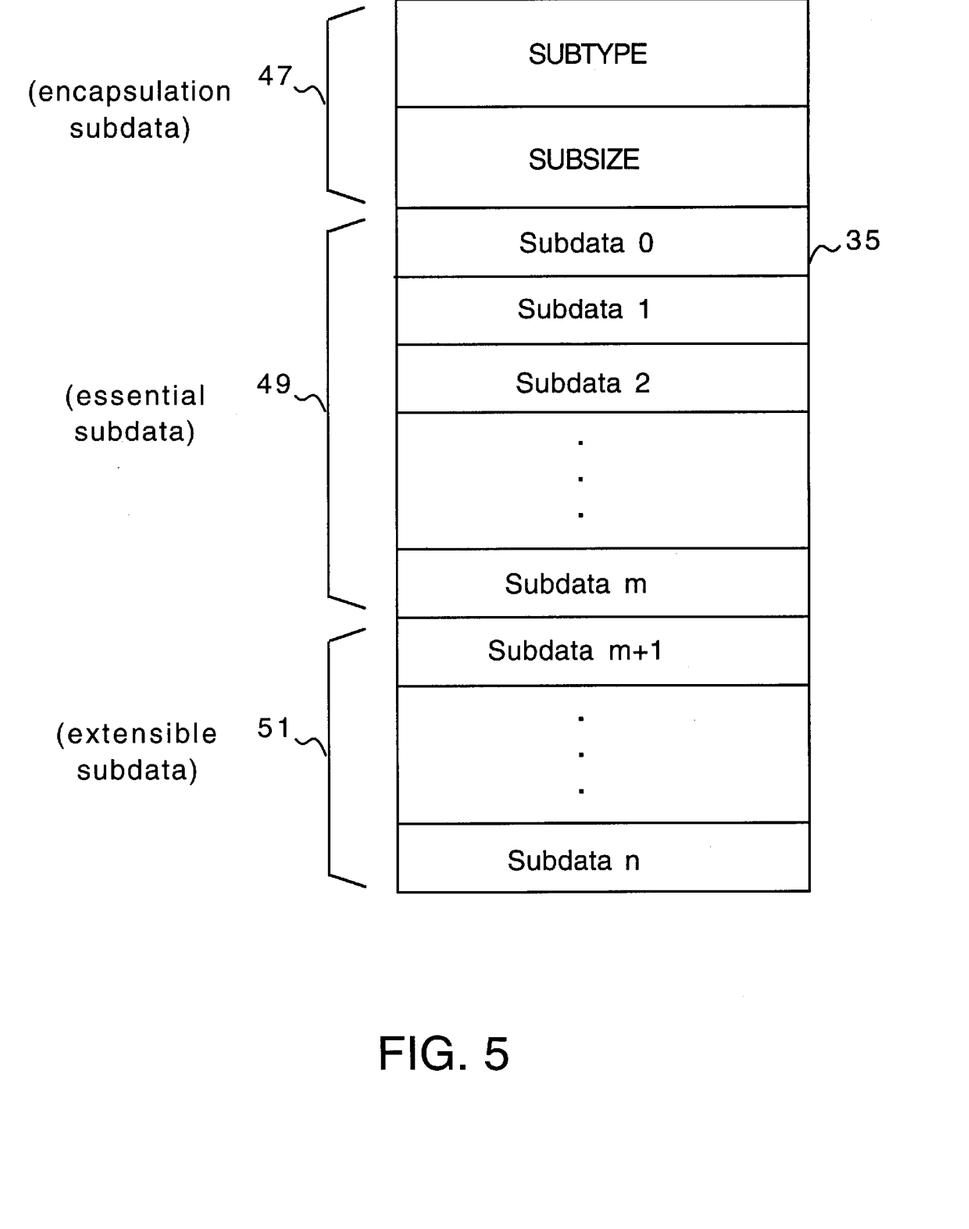
FIG. 5 is a detailed block diagram showing the preferred organization of subobjects as taught in the present invention.

Referring now to FIG. 5, a memory map of subobject1 35 is shown. The organization of subobject1 35 is very similar to that of the organization of object 33. Encapsulation subdata 47 includes the subtype and the subsize. Essential subdata 49 includes a string of data words shown in FIG. 5, represented in the mapping as subdata 0 through subdata m. Extensible subdata 51 contains an additional string of data words, subdata m+1 to subdata n. The total number of bytes used by the subdata is added to the total number of bytes used within object 33 and is stored in the size field of encapsulation data 41 of the object. In addition to subobject1 35, additional subobjects may be contained within the object 33 and the contribution in memory size that each of the subobjects makes to the overall object size is added to the size field of encapsulation data 41.

Figure 6:
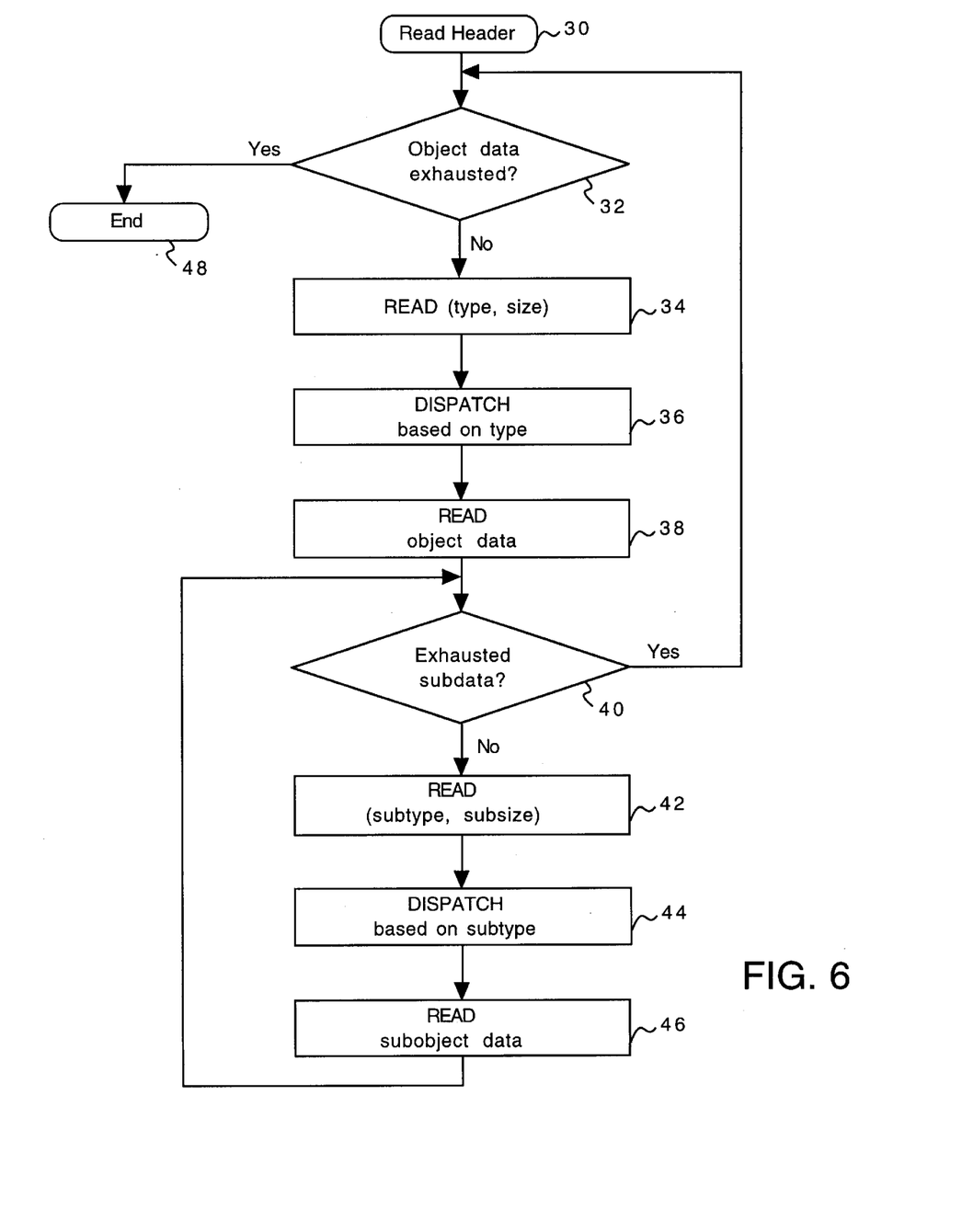
FIG. 6 is a flow diagram illustrating the process for accessing object and subobject data of the present invention.

Referring now to FIG. 6, a flow chart is shown illustrating the process for accessing objects and subobjects of the present invention. CPU 11 of FIG. 1 reads 30 the header 29 data stored in mass storage 27, and determines the type and size of objects contained within metafile 31. Using the header 29 table of contents, the CPU 11 is able to determine the location within metafile 31 of the desired object. In step 32, CPU 11 determines whether additional objects remain to be processed. If all objects have been processed, then the routine ends in step 48. If additional objects are to be accessed, CPU 11 continues by processing encapsulation data in step 34. The contents of the object size field is stored in object size register 26. CPU 11 then dispatches the appropriate read algorithm to process the data contained in the object in step 36. The object data is then read in step 38 and processed by CPU 11, according to application program instructions stored in program memory 23. As the object data is read, the CPU 11 keeps track of the size of the object and the corresponding amount of data that has been read by decrementing the contents of the object size register 26.

When the object data has been read, the CPU proceeds to process subobject data by first testing the contents of the object size register 26. In step 40, CPU 11 tests the contents of object size register 26 against zero, to determine whether additional subobject data remains to be processed. If the contents of the object size register 26 equals zero, then all of the data within the object has been read, the CPU 11 branches to step 32 where it again checks whether all objects have been exhausted. In the event additional object memory space is indicated by the object size register 26, the CPU 11 then reads subtype and subsize information in step 42 of the first subobject. The subsize information is then stored in a subsize register 28 (FIG. 1) for use with sub-subobjects, if any are used within the subobject structure. Based on the subtype of the subobject data, the CPU dispatches a read algorithm to process the subobject subdata in step 44. In step 46 the subobject data is read and the CPU then loops to step 40 to test whether all subdata has been exhausted. Processing of the object data continues until all objects have been processed.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. A computer-readable storage medium in a data processing system for storing an extensible object containing extensible object data and for enabling the extensibility of a stored object, said medium comprising:

a header, wherein said header comprises at least one header field for containing extensible-object identifier data, extensible-object version data, extensible-object revision data, extensible-object endian data, and a header remaining-size field for containing a size of remaining header data;

an object field containing current extensible object data comprising a set of original object attributes stored in the object data memory when the object is created;

an object extension field which is extensibly appended to said object field, said object extension field comprising object extension data which are added to the object; and a size data field coupled to said object, wherein said size data field comprises a size attribute which is modified to indicate a combined size of said current object data and said object extension data.

2. The computer-readable storage medium according to claim 1, wherein the attributes of the object extension field are added after the object is created.

3. The computer-readable storage medium according to claim 1, further comprising an object name field identifying the name of said object.

4. The computer-readable storage medium according to claim 2, further comprising a version field identifying the version number of said object.

5. The computer-readable storage medium according to claim 2, further comprising a revision field identifying the revision number of said object.

6. The computer-readable storage medium according to claim 2, further comprising at least one address pointer to a table of contents, wherein the table of contents identifies the location of the stored object within the data processing system.

7. The computer-readable storage medium according to claim 1, wherein said object extension field further comprises a subobject.

8. The computer-readable storage medium according to claim 7, wherein said subobject further comprises a data subtype field identifying a data subtype contained within said subobject.

9. The computer-readable storage medium according to claim 7, wherein said subobject further comprises a data subsize field identifying the file subsize of said subobject.

10. The computer-readable storage medium according to claim 7, wherein said subobject further comprises a sub-subobject for extending the description of said subobject.

11. The computer-readable medium of claim 1, wherein said current extensible object data includes at least one object element selected from the group consisting of objects, subobjects, and sub-subobjects.

12. The computer-readable medium of claim 11, wherein said object element consists of at least one object.

13. The computer-readable medium of claim 1, wherein said object extension data includes at least one object element.

14. The computer-readable medium of claim 1, wherein said extensible-object header field further comprises at least one reserved field for containing additional header data.

15. The computer-readable medium of claim 1, wherein said header further comprises a table of contents pointer for locating an associated table of contents.

16. A computer-readable storage medium in a data processing system for executing an application program and enabling the extensibility of a stored object, the computer-readable storage medium comprising:

means for creating a header data field comprising stored object size and type information;

means for appending a first data field to the header data field comprising a set of original object attributes; and means for appending an object extension field to the first data field, the object extension field comprising attributes which have been added to extend functionality of the object.

17. The computer-readable storage medium according to claim 16, wherein said header data field stored object size reflects the size of both said first data field and said object extension field.

18. A method in a data processing system computer-readable storage medium for enabling the extensibility of a stored object, the method comprising:

creating a header data field comprising stored object size and type information;

appending a first data field to the header data field comprising a set of original object attributes; and appending an object extension field to the first data field, the object extension field comprising attributes which have been added to extend functionality of the object.

19. The method according to claim 18, wherein the stored object size in the header data field reflects the size of both the first data field and the object extension field.

20. The method according to claim 18 further comprising the step of accessing the stored object comprising the sub-steps:

reading the object size and type information contained within the header data field to determine the type of data and the amount of data contained within the object;

dispatching a routine which is programmed to read the type of data contained within the object;

reading the object attribute data stored in the first data field; and testing the size information to determine whether all the object attribute data has been read.

21. The method for accessing objects according to claim 20, in which after the step of reading the object size and type data, the method further comprises storing the size information to an object size register in order that the stored size information may be used in the step of testing.

22. The method for accessing stored objects according to claim 20, in which after the step of testing, the method further comprises reading subobject data contained within the object.

23. The method for accessing stored objects according to claim 22 in which prior to the step of reading subobject data, the method further comprises reading subtype and subsize information.

24. A computer-readable medium comprising program instructions for enabling the extensibility of a stored object data by performing the steps of:

creating a header data field comprising stored object size and type information;

appending a first data field to the header data field comprising a set of original object attributes; and appending an object extension field to the first data field, the object extension field comprising attributes which have been added to extend functionality of the object.

* * * * *